April 18, 1967   A. SZERENYI   3,314,173
FOOTWEAR
Filed Nov. 26, 1962
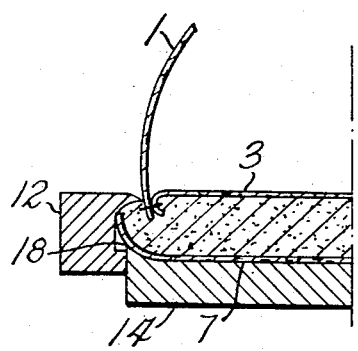
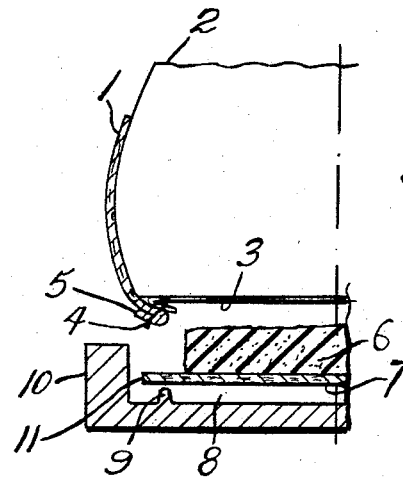
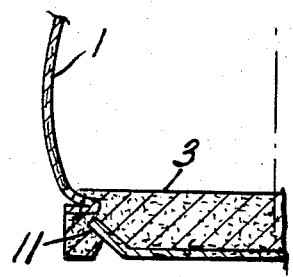
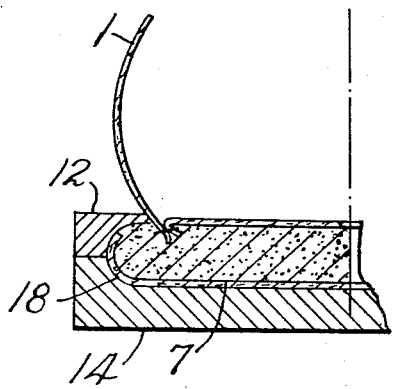
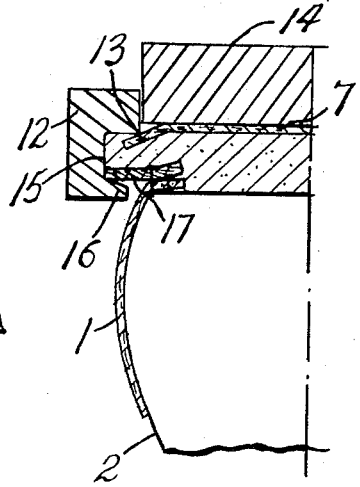
INVENTOR.
BY Andrew Szerenyi United States Patent Office 3,314,173
Patented Apr. 18, 1967

3,314,173
FOOTWEAR
Andrew Szerenyi, Waynesville, N.C., assignor to Ro-Search, Inc., Waynesville, N.C., a corporation of North Carolina
Filed Nov. 26, 1962, Ser. No. 239,966
4 Claims. (Cl. 36—2.5)

Since their introduction, shoes with porous rubber soles molded and vulcanized directly to the upper have customarily been provided with tread soles. Such tread soles, usually sheet stock of rubber or leather, were placed into the vulcanization mold to be bonded directly to the porous rubber.

In my earlier Patent 2,129,106, I disclosed footwear of this type, in which the tread sole element had an upstanding outer rim so as to protect the sponge rubber not only on its bottom surface, but also along the side rim of the sole. There remained a narrow rim of sponge rubber between the upper and the extended tread sole element, which was not subject to undue strain, being protected by its nearness to the upper. The tread sole element was pre-molded when desired in order to have greater thickness at the main wear surface and lesser thickness in its upstanding rim.

The present invention refers to footwear of the type described above, with a tread sole element usually, but not exclusively of sheet stock, again protecting the bottom surface of the sole as well as partly the side rim thereof.

One object of the invention is the manufacture of footwear of the type described in which the closing of the mold and the molding pressure are used to obtain a sealing of sole element in the mold cavity to prevent escape of the elastomeric material during the molding.

Another object of the invention is a mold of simple and inexpensive design, which allows the manufacture of the footwear according to the invention and results in a finished product which does not require trimming or other finishing operations.

Still another object of the invention is to provide footwear of this type in which the bottom surface of the sole and the lower part of its side rim is protected by the tread sole, while the remaining part of the side rim shows the sponge rubber layer and thereby improves the appearance of the sole.

Further objects of the invention are clarified in the drawing, which shows in FIG. 1, in cross section, the upper and the material for the sole in the vulcanization mold prior to the molding and vulcanizing of the sole. FIG. 2 shows in a similar cross section the shoe after vulcanization, removed from the mold. FIG. 3 shows, in cross section, a shoe of similar construction, at the end of the molding cycle, while still in a mold of different design. FIG. 4 and FIG. 5 show, in cross section, other variations of the mold design.

According to the present invention the manufacture of footwear is improved by providing mold surfaces against which suitable sole elements can be placed in a sealing relation so that in a single molding operation a molded shoe of good appearance can be created, the sole of which does not require finishing steps after de-molding.

The invention provides further to bend sole elements, such as the tread sole or cover strips often used for such footwear, in the molding operation so that the edge of the sole element becomes fully embedded in the molded elastomeric material, and there is sharp definition of the line to which the sole element is visible. This line is determined not by the size or the placement of the sole element, but by the location of the sealing edge.

As shown in FIG. 1, the upper 1 is connected to a sock lining 3. The mold 10, shown here as a one-piece-mold, is provided with a rib 9 a short distance from and configurate to the side rim of the desired sole. A tread sole 7, usually a flat sheet of rubber or leather, can be placed into the mold to rest atop the rib or ridge 9. A mix 6 of elastomeric material, for example a mix for the forming of porous rubber, is placed on the tread sole and the mold closed by the upper on the last. When the mold is so closed and heated the pressure of the mix 6 will force the tread sole 7 to deform so that the center thereof sinks into the space 8 and the edge 11 is bent upward. The mix 6 will flow around the edge 11 and embed it on all three sides in the elastomeric mix. None of this elastomeric material will flow into the space 8, as the pressure of the elastomeric material seals the tread sole tightly against the rib 9.

The pressure of the elastomeric material created through the closing of the mold and/or the heating of the elastomeric material is used also to seal the upper against the mold. For this purpose the bottom margin of the upper is folded back, as shown in FIG. 1, and held in this position through the seam 4, which might be the same seam used to connect a sock lining to the upper or to hold a string suitable to glide therein for string-lasting purposes. When the last 2, with the upper, is placed into the mold, the bottom edge 5 of the upper will rest loosely against the inner side wall of the mold. The pressure of the elastomeric material, as it expands, will press the fold outwardly and cause a tight seal between such edge 5 and the mold wall.

The sealing of the bottom margin of the upper against the side wall of the mold is easily and effectively accomplished also in the known molds which comprise a divided side frame and a bottom plate. As shown in FIG. 3 the upper 1 may be provided with a welt 17 fastened to the bottom margin of the upper. As the divided side frame 12 of the mold closes, the edge 15 of the welt is contacted by the side wall of the mold and the mold cavity is sealed. The lip 16 of the side frame mold does not need to contact the material of the upper nor is it necessary to use this lip to exert pressure.

The deformation of the tread sole 7 according to the invention can also be obtained easily by providing a step in the tread surface of the mold. FIG. 3 shows the preferred arrangement whereby the step 13 is part of the mold side frame 12, separate from the tread surface of the mold bottom plate 14.

The bending of the tread sole edge into the elastomeric material so as to embed it fully therein can be accomplished along the side run of the sole, as well as if the tread sole is to end at the breast of a heel. A ridge in the mold at such location will cause the bending of the tread sole edge into the elastomeric material. If a pre-molded heel is used, the heel edge itself might be used instead. Similarly, if a cover strip for a platform sole is provided the invention permits embedding only the marginal edge of said cover along the sealing edge, thereby producing a neat, ornamental appearance.

FIG. 4 shows a mold design which differs from the mold shown in FIG. 3 in that the sealing edge (provided in the mold of FIG. 1 by the rib 9, or in the mold of FIG. 3 by the edge 13) is represented by a rib 18, which is part of the sole bottom plate 14. This rib 18 will again cause the edge of the tread sole to turn towards the upper.

Depending on the ornamental effect desired, the side frame 12 might join the sole bottom plate 14 in various ways. There might be a step for a side rim of reduced thickness as shown in FIG. 3 or the step might be eliminated and the continuation of the rib 18 might be foreseen, as shown in FIG. 5 in the side frame. As in the mold designs of FIGS. 3 and 4 the sole bottom plate and frame do not join in the tread surface of the sole, but in the area of the side rim.

The elastomeric material used for the manufacture of the footwear described is most commonly rubber, the product of the Hevea plant. The advantages of the invention will also be fully realized if other material or synthetic elastomers are used, which result in soles of similar qualities. The curing might be vulcanization under heat and pressure, under heat alone or even self-curing. The sealing of the sole material against the mold surfaces as described above will also be accomplished when the elastomeric material is injected into the mold as a fluid, such as a plastisol. If desired, filler material such as felt or sponge will sometimes be placed to advantage between the last and mold bottom before closing the mold so that the tread sole edge is forced upward before the plastisol is introduced into the mold cavity.

What is claimed is:

1. Footwear comprising an upper, a welt-like element stitched to said upper, a tread sole of sheet material, and a layer of elastomeric material molded and cured to said welt-like element and said tread sole, said tread sole having its margin turned inwardly into said elastomeric layer and being fully embedded therein, said welt-like element joined to said elastomeric layer only at its underside, so as to have its upper side and its side rim exposed.

2. Footwear comprising an upper having a welt-like extension, a tread sole of sheet material, and a layer of elastomeric material molded and cured to said welt-like extension, said tread sole having its margin turned inwardly into said elastomeric layer and being fully embedded therein, and the edge of the welt turned inwardly into said elastomeric layer and embedded therein.

3. A sole for footwear comprising a tread sole of sheet material and a layer of elastomeric material, said elastomeric material being molded and cured to said tread sole, said tread sole having its margin turned upwardly and spaced away from the outside of the sole and positioned into said elastomeric layer and being fully embedded therein, so that the margin of said tread sole is surrounded by said elastomeric material and the elastomeric material forms the outer periphery of said sole.

4. Footwear comprising an upper, a tread sole of sheet material and a layer of elastomeric material, said elastomeric material being molded and cured to said upper and to said tread sole, said tread sole having its margin turned upwardly and spaced away from the outside of said layer and positioned into said elastomeric layer and being fully embedded therein, so that the margin of said tread sole is surrounded by said elastomeric material and the elastomeric material forms the outer periphery of said sole.

References Cited by the Examiner

UNITED STATES PATENTS

| | | | |
|---|---|---|---|
| 2,580,245 | 12/1951 | Rollman | 12—142 X |
| 2,695,464 | 11/1954 | Sherman | 36—30 X |
| 3,009,204 | 11/1961 | Bingham et al. | 18—34 |
| 3,014,244 | 12/1961 | Hansjosten | 18—34 |
| 3,042,975 | 7/1962 | Bingham et al. | 264—244 |
| 3,074,185 | 1/1963 | Hansjosten | 36—14 |
| 3,098,308 | 7/1963 | Liebscher et al. | 36—14 |
| 3,109,701 | 11/1963 | Jacquet | 264—244 |
| 3,114,981 | 12/1963 | Murawski | 36—2.5 |
| 3,120,710 | 2/1964 | Romen | 36—2.5 |

FOREIGN PATENTS 1,053,881  2/1954  France.

PATRICK D. LAWSON, *Primary Examiner.*

A. H. BRODMERKEL, F. MARLOWE,
*Assistant Examiners.*